United States Patent
Bae et al.

(10) Patent No.: US 9,414,275 B2
(45) Date of Patent: Aug. 9, 2016

(54) COMMUNICATION SYSTEM FOR HANDOVER TO FEMTO BASE STATION AND METHOD FOR THE SAME

(75) Inventors: Eun Hui Bae, Seoul (KR); Chae Gwon Lim, Seoul (KR); Sung Ho Choi, Suwon-si (KR); Tae Sun Yeoum, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 789 days.

(21) Appl. No.: 13/120,778

(22) PCT Filed: Sep. 21, 2009

(86) PCT No.: PCT/KR2009/005368
§ 371 (c)(1),
(2), (4) Date: Mar. 24, 2011

(87) PCT Pub. No.: WO2010/035995
PCT Pub. Date: Apr. 1, 2010

(65) Prior Publication Data
US 2011/0183675 A1      Jul. 28, 2011

(30) Foreign Application Priority Data
Sep. 24, 2008    (KR) .......................... 10-2008-0093792

(51) Int. Cl.
*H04W 36/30* (2009.01)
*H04W 36/04* (2009.01)
H04W 36/00 (2009.01)
H04W 84/04 (2009.01)

(52) U.S. Cl.
CPC .......... *H04W 36/04* (2013.01); *H04W 36/0061* (2013.01); *H04W 84/045* (2013.01)

(58) Field of Classification Search
None
See application file for complete search history.

(56) References Cited

U.S. PATENT DOCUMENTS

| | | | | |
|---|---|---|---|---|
| 8,107,964 | B2* | 1/2012 | Nylander | H04L 29/12066 370/331 |
| 2005/0085232 | A1 | 4/2005 | Laitinen et al. | |
| 2007/0060122 | A1* | 3/2007 | Tang et al. | 455/432.1 |
| 2007/0183427 | A1* | 8/2007 | Nylander | H04L 29/12066 370/395.2 |
| 2008/0132239 | A1* | 6/2008 | Khetawat | H04W 36/12 455/438 |
| 2009/0280819 | A1* | 11/2009 | Brisebois | H04W 52/244 455/446 |
| 2010/0113029 | A1* | 5/2010 | Bjorken | H04W 36/0066 455/437 |
| 2010/0178921 | A1* | 7/2010 | Aqvist | H04W 36/04 455/436 |
| 2010/0197311 | A1* | 8/2010 | Walldeen | H04W 36/0055 455/444 |
| 2011/0098041 | A1* | 4/2011 | Tomita | H04W 36/04 455/434 |
| 2011/0263274 | A1* | 10/2011 | Fox | H04W 68/04 455/456.2 |

FOREIGN PATENT DOCUMENTS

| KR | 10-0684309 B1 | 2/2007 |
|---|---|---|
| WO | 2008/062200 A2 | 5/2008 |

* cited by examiner

*Primary Examiner* — Vladimir Magloire
*Assistant Examiner* — Frank Donado
(74) *Attorney, Agent, or Firm* — Jefferson IP Law, LLP

(57) ABSTRACT

A wireless communication system for performing a handover to a femto base station is provided. The system includes user equipment, a femto subscriber information storage, a core network entity or a macro base station or a serving base station. The femto subscriber information storage stores a list of femto base stations that allows the access of user equipment, i.e., an accessible list. The core network entity or the macro base station receives and stores the accessible list. When any of the user equipment requests a handover toward a femto base station as a target base station, and the target base station is included in the accessible list stored, the core network entity or the macro base station requests a handover toward the target base station. A method for performing a handover to the core network entity and the macro base station is also provided.

8 Claims, 7 Drawing Sheets

COMMUNICATION SYSTEM FOR HANDOVER TO FEMTO BASE STATION AND METHOD FOR THE SAME

BACKGROUND OF THE INVENTION

1. Field of the Invention

This invention relates to wireless communication systems and methods for performing a handover, and more particularly, to a communication system and method for performing a handover to a femto base station.

2. Description of the Related Art

The term 'femto-' is a prefix in the metric system denoting a factor of $10^{-15}$. A femto cell refers to a device that can improve the coverage of cellular systems in relatively small areas. This femto cell is controlled by a base station, which is called a femto base station. A femto base station refers to an indoor base station that is very small, consumes little electric power, and is intended to be used in a home/office. The term femto cell is frequently used to refer to a pico-cell. However, the femto cell is also more advanced in terms of functions than the pico-cell. A femto base station, serving as a small cellular base station connected to a broadband router, connects conventional 2G and 3G networks to a backbone network of mobile communication, via a DSL link, etc., in order to transmit voice signals and data.

In Release 8 of the 3GPP Long Term Evolution (LTE), evolved Node B (eNB) and home eNB, which are base stations, have been defined. The eNB is a macro base station that operates general macro cells. The home ENB is a femto base station that operates femto cells.

When user equipment intends to perform a handover from a macro-base station to a femto base station, it must be registered in the femto base station. That is, in order to perform a handover from a macro-base station to a femto base station by user equipment, Access Control is required to ascertain whether the user of the user equipment is permitted to use services from the femto base station.

SUMMARY OF THE INVENTION

The invention has been made in view of the above problems, and provides a communication system and method for performing a handover to a femto base station via Access Control.

In accordance with an exemplary embodiment of the invention, the invention provides a wireless communication system for performing a handover to a femto base station, including: a femto subscriber information storage and a serving base station. The femto subscriber information storage stores a list of femto base stations that allow for the access of user equipment, i.e., an accessible list. The serving base station stores a list of target user equipment serviced by the serving base station, from among the accessible list. The serving base station requests a handover procedure for a target base station when the target base station, to which any of the target user equipment is intended to perform a handover, is a femto base station, and when the target base station is included in the accessible list of the user equipment.

Preferably, when the user equipment requests to be attached to the serving base station from the serving base station, the serving base station requests the accessible list for the user equipment from the subscriber information storage, via identification-information regarding the user equipment, and acquires it.

In accordance with another exemplary embodiment of the invention, the invention provides a wireless communication system for performing a handover to a femto base station, including: a femto subscriber information storage and a core network entity. The femto subscriber information storage stores a list of femto base stations that allow for the access of user equipment, i.e., an accessible list. The core network entity stores a list of target user equipment serviced by the core network entity, from among the accessible list, and requesting a handover procedure for a target base station when the target base station, to which any of the target user equipment is intended to perform a handover, is a femto base station, and when the target base station is included in the accessible list of the user equipment.

Preferably, when the user equipment requests to be attached to the core network entity from the core network entity, the core network entity requests the accessible list for the user equipment from the subscriber information storage, via identification-information regarding the user equipment, and acquires it.

In accordance with another exemplary embodiment of the invention, the invention provides a wireless communication method for performing a handover to a femto base station, including: storing, by a serving base station, a list of target user equipment serviced by the serving base station, from among a list of femto base stations that allow for the access of user equipment, i.e., an accessible list; determining, by the serving base station, when a target base station, to which any of the target user equipment is intended to perform a handover, whether the target base station is included in the accessible list of the user equipment; and requesting, by the serving base station, when the target base station is included in the accessible list of the user equipment, a handover procedure to the target base station.

Preferably, storing a list of target user equipment includes: requesting, when the user equipment requests to be attached to the serving base station from the serving base station, the accessible list for the user equipment from a subscriber information storage, via identification-information regarding the user equipment; and acquiring the accessible list.

In accordance with another exemplary embodiment of the invention, the invention provides a wireless communication method for performing a handover to a femto base station, including: storing, by a core network entity, a list of target user equipment serviced by the core network entity, from among a list of femto base stations that allow for the access of user equipment, i.e., an accessible list; determining, by the core network entity, when a target base station, to which any of the target user equipment is intended to perform a handover, whether the target base station is included in the accessible list of the user equipment; and requesting, by the core network entity, when the target base station is included in the accessible list of the user equipment, a handover procedure to the target base station.

Preferably, storing a list of target user equipment includes: requesting, when the user equipment requests to be attached to the core network entity from the core network entity, the accessible list for the user equipment from a subscriber information storage, via identification-information regarding the user equipment; and acquiring the accessible list

BRIEF DESCRIPTION OF THE DRAWINGS

The features and advantages of the invention will become more apparent from the following detailed description in conjunction with the accompanying drawings, in which.

DETAILED DESCRIPTION OF EXEMPLARY EMBODIMENTS

Hereinafter, exemplary embodiments of the invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

Figure 1:
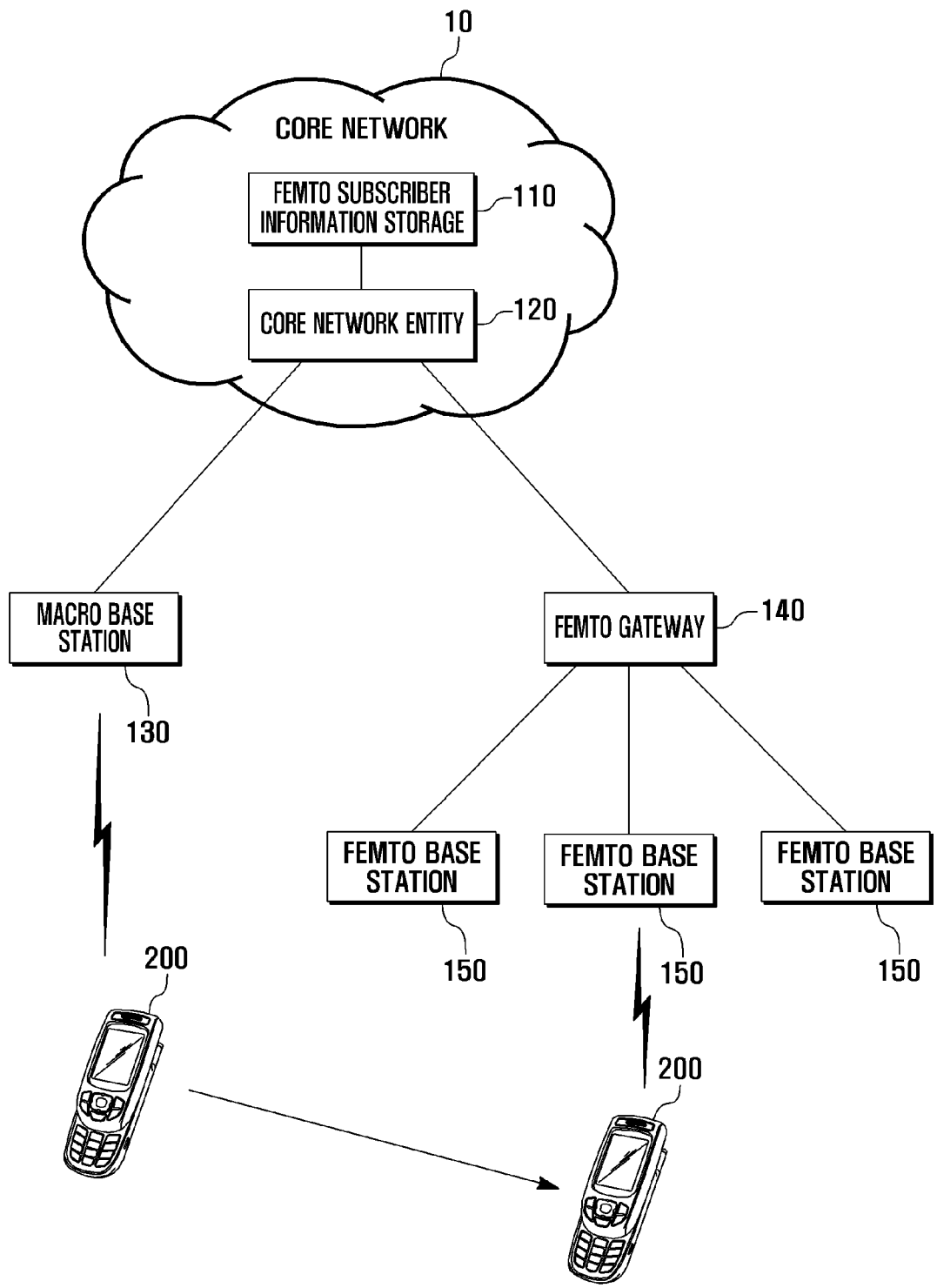
FIG. 1 is a schematic diagram illustrating a configuration of a communication network according to an embodiment of the invention.

The following description provides a communication network according to an embodiment of the invention. FIG. 1 is a schematic diagram illustrating a configuration of a communication network according to an embodiment of the invention.

Referring to FIG. 1, the communication network system includes a core network 10, a macro base station (macro-BS) 130 connected to the core network 10, and a femto base station (femto BS) 150 connected to the core network 10 via a femto gateway 140. The core network 10 includes a femto subscriber information storage 110 and a core network entity 120.

In an embodiment of the invention, user equipment (UE) 200 performs a handover from a serving base station to a femto base station 150. The serving base station may be a macro base station 130 or a femto base station 150.

The macro base station 130 controls macro cells, where macro cells refer to cells for cellular systems. For example, a macro base station may be a NodeB (NB) or an evolved NodeB (eNB).

When the macro base station 130 is a serving base station, the macro base station 130 can receive and store a list of femto cells that allow for the access of user equipment 200 serviced by the macro base station 130, which is an accessible list. When the macro base station 130 receives a request to perform a handover to the femto base station 150 from the user equipment 200, it determines whether the user equipment 200 can be moved, via the accessible list.

Femto cells cover a coverage area related to a factor of femto- or equivalent to the factor. Femto cells can cover a smaller coverage area than the macro cell. Femto cells can support a small coverage area, such as an area corresponding to a house or an area corresponding to a room in the house. There are a number of femto cells in a macro cell.

In an embodiment of the invention, the femto base station 150 corresponds to the macro base station 130 in terms of size, and also controls small cells in a macro cell. The femto base station 150 can provide services even in indoor or outdoor coverage gaps, and can also provide a higher level of data to more users. For example, the femto base station 150 may be a home NodeB (HNB) or home evolved NodeB (HeNB).

When the femto base station 150 is a serving base station, the femto base station 150 can receive and store a list of femto cells that allow for the access of user equipment 200 serviced by the femto base station 150, which is an accessible list. When the femto base station 150 receives a request to perform a handover to the femto base station 150 from the user equipment 200, it determines whether the user equipment 200 can be moved, via the accessible list.

The core network 10 refers to a network of a wireless communication service provider. The core network entity 120 of the core network 10 controls the mobility of user equipment 200.

The core network entity 120 receives and stores a list of femto cells that allow for the access of user equipment 200 serviced by the core network entity 120, which is an accessible list. When the core network entity 120 receives a request to perform a handover to the femto base station 150 from the user equipment 200, it determines whether the user equipment 200 can be moved, via the accessible list.

The femto subscriber information storage 110 refers to a server that stores information regarding femto cell subscribers (user equipment). In particular, the femto subscriber information storage 110 can store a service profile used to determine whether user equipment 200 is registered to use a femto service provided by the femto base station 150.

The femto subscriber information storage 110 stores a list of femto cells that allow for access according to subscribers or user equipment, i.e., an accessible list, which is a type of service profile. This accessible list may be a whitelist. The femto subscriber information storage 110 stores the accessible list according to subscribers or user equipment. Although the embodiment of the invention is described in such a manner that the femto subscriber information storage 110 stores the accessible list according to user equipment, it should be understood that the invention is not limited to the embodiment. For example, when user equipment 200 uses information that allows for the identification of a subscriber via a device such as USIM, etc., the embodiment may be implemented in such a manner that the femto subscriber information storage 110 stores the accessible list according to subscribers.

The accessible list is stored in such a manner that user equipment 200 is mapped to femto cells that are permitted access thereto. In order to differentiate these femto cells, the accessible list is also stored with identification-information. The femto subscriber information storage 110 may be a Home Subscriber Server (HSS) that stores essential subscriber information with respect to a network, or a Repository/Server that stores information regarding a femto base station 150 other than a given HSS.

The core network 10 may further include a Mobility Management Entity (MME), a Serving Gate Way (S-GW), a Packet Data Network Gate Way (P-GW), a Serving GPRS Support Node (SGSN), a Radio Network Controller (RNC) and a Secure Gate Way (Secure GW).

In addition, the core network 10 may further include an MME, an S-GW, a P-GW, and an Unlicensed Mobile Access Network/General Access Network (UMAN/GAN) controller. In an embodiment of the invention, the core network entity 120 may be an MME.

In an embodiment of the invention, the femto gateway 140 may be a Secure GW or a UMAN/GAN controller.

In order to clearly illustrate the features of the invention, the components of the core network, related to the invention, are described, but others are not.

The user equipment 200, according to an embodiment of the invention, is intended to perform a handover from a macro base station 130 to a femto base station 150 or from a femto base station 150 to another femto base station 150. The user equipment 200 receives identification-information from the femto base station 150, and then transmits a Measurement Report including the identification-information, thereby requesting a handover.

A femto base station 150 is identified from other base stations (a macro base station, other femto base stations, etc.) by combining a Physical Cell ID (PCID) or PCID, Global Cell ID (GCID), Tracking Area ID (TAD), etc.

The user equipment 200 can transmit system information, including identification-information regarding a femto base station covering a coverage area to which the user equipment 200 is intended to move, to the macro base station 130 via the Measurement Report. According to the LTE, the system information may be transmitted to the user equipment 200 via a Physical Downlink Shared Channel (PDSCH). For example, the system information may be System Information Block, System Information Block 1, etc.

In order to perform Access Control for a handover to a femto base station 150, the serving base station is required to determine whether corresponding user equipment (or a corresponding subscriber) can perform a handover to a target femto base station 150. This can also be done by determining whether the user equipment is registered in the accessible list.

As described above, the accessible list refers to a list of femto cells (base stations) that allow for the access of certain user equipment. The accessible list is stored in such a manner that user equipment 200 is mapped to femto cells that are permitted access thereto. In order to differentiate these femto cells, the accessible list is also stored with identification-information. The identification-information includes PCID, GCID, and TAID.

The embodiment of the invention is described, assuming that the user equipment 200 performs a handover from a serving base station (e.g., a macro base station or a femto base station) to a femto base station 150. As described above, the determination as to whether to perform a handover can be conducted by a serving base station (a macro base station or a femto base station) or a core network entity 120.

The following description explains how the respective macro base station 130, femto base station 150 and core network entity 120 operate in order to perform a handover.

Figure 2:
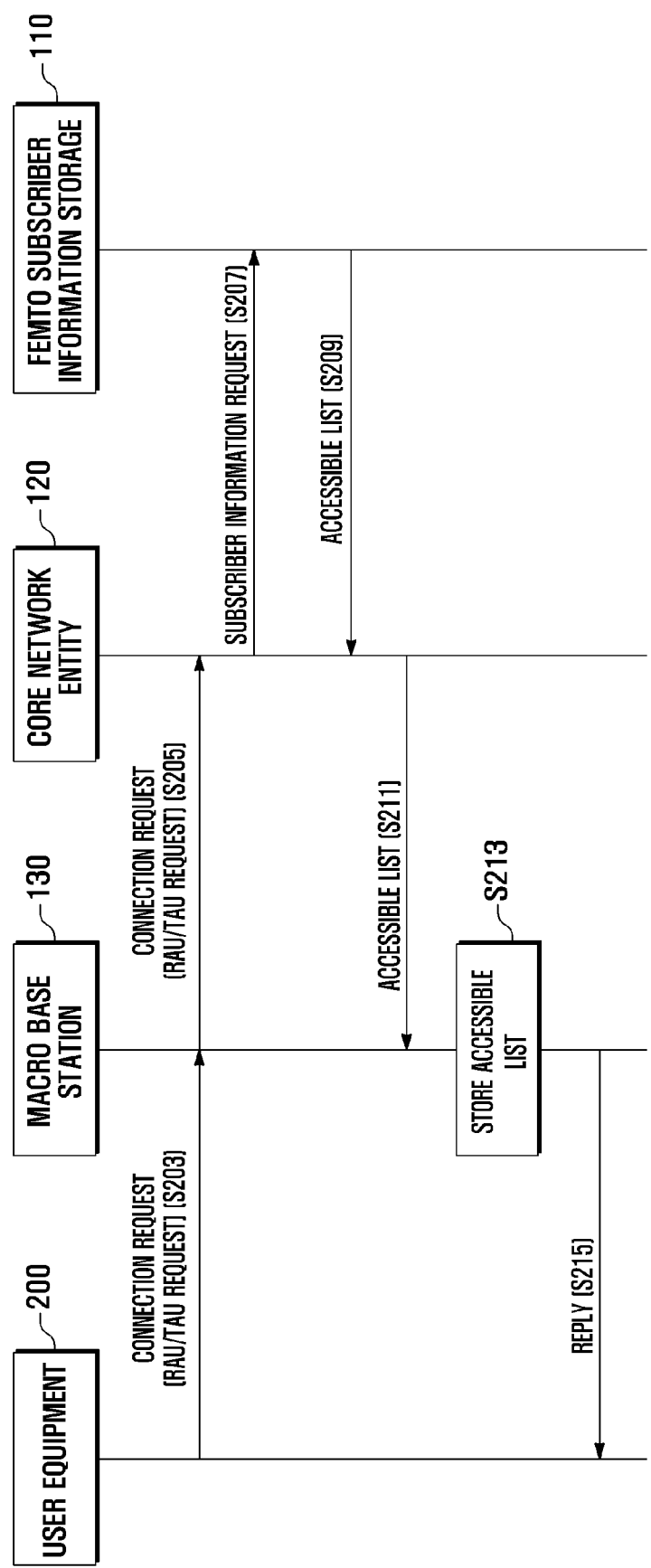
FIG. 2 is a procedure diagram that describes a method where a macro base station acquires an accessible list of user equipment, according to an embodiment of the invention.

First, a method for acquiring an accessible list by a macro base station 130 is explained. FIG. 2 is a procedure diagram that describes a method where a macro base station acquires an accessible list of user equipment, according to an embodiment of the invention.

The procedure shown in FIG. 2 is described, assuming that user equipment 200 is turned on and then initially accesses a broadband wireless communication network or performs a handover process.

Referring to FIG. 2, the user equipment 200 requests an Attach from the core network entity 120, via the macro base station 130 (S203 and S205). The Attach Request of the user equipment 200 is done so that the user equipment 200 is attached to a broadband wireless communication network when the user equipment 200 is initially turned on.

In addition, when the user equipment 200 requests movement to the core network entity 120 during an idle mode, it can also request a Routing Area Update (RAU) or Tracking Area Update (TAU) from the core network entity 120 via the macro base station 130 (S203 and S205).

After receiving the Attach Request or RAU/TAU Request, the core network entity 120 requests subscriber information regarding the user equipment 200 from the femto subscriber information storage 110 (S207). The subscriber information is an accessible list (or whitelist) for corresponding user equipment 200. When requesting the accessible list, the core network entity 120 also transmits identification-information regarding user equipment. The identification-information regarding user equipment may be a permanent ID or a temporary ID. For example, a permanent ID may be an International Mobile Station Identity (IMSI). In addition, a temporary ID may be a Temporary Mobile Subscriber Identity (TMSI), a SAE-Temporary Mobile Subscriber Identity (S-TMSI), or the like.

The femto subscriber information storage 110 searches for an accessible list for the user equipment 200, and then transmits the searched accessible list to the core network entity 120 (S209).

The core network entity 120 transmits the accessible list to the macro base station 130, via a reply to the Attach Request (S211).

The macro base station 130 receives and stores the accessible list for the user equipment 200 (S213). The stored accessible list is used, later, to perform Access Control when the user equipment 200 performs a handover to the femto base station 150. After that, the macro base station 130 transmits a reply message responding to the Attach Request to the user equipment 200 (S215). The reply message does not include an accessible list.

Figure 3:
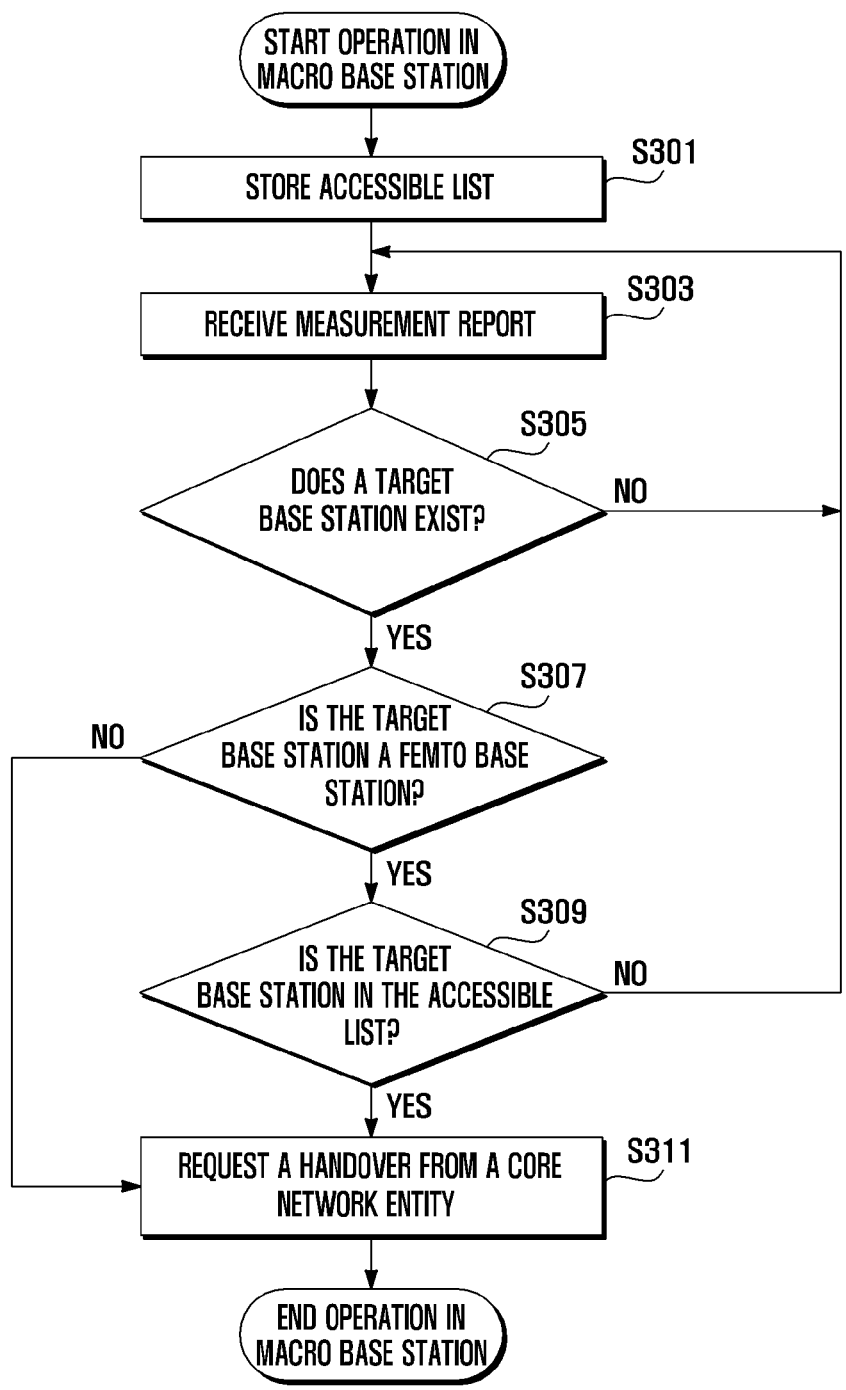
FIG. 3 is a flow chart that describes a method for performing an access control in a macro base station, according to an embodiment of the invention.

The following description provides an operation of the macro base station 130 that performs Access Control for a handover to a target femto base station 150, where the macro base station 130 has stored an accessible list as described in above section. FIG. 3 is a flow chart that describes a method for performing an access control in a macro base station, according to an embodiment of the invention.

The method shown in FIG. 3 will be described, assuming that the macro base station 130 has stored an accessible list (S301). That is, the macro base station 130 has received and stored the accessible list according to user equipment (or users), via the method described above referring to FIG. 2.

When a particular predefined event is previously or periodically sensed, the user equipment 200 transmits a Measurement Report to the macro base station 130. That is, the user equipment 200 periodically scans peripheral base stations and then transmits information to a serving base station via a Measurement Report. The particular event refers to an event where the RSSI of peripheral base stations is greater than that of a serving base station when the difference reaches or exceeds a preset value. The user equipment 200 transmits information regarding the peripheral base station according to a corresponding event to a serving base station via a Measurement Report.

The Measurement Report includes information regarding the peripheral base stations that the user equipment 200 received from the peripheral base stations. In particular, the Measurement Report may include system information containing identification-information regarding the femto base station 150. The macro base station 130 awaits the reception of a Measurement Report transmitted from the user equipment 200.

The macro base station 130 receives a Measurement Report (S303), and then determines whether any of the peripheral base stations included in the received Measurement Report is a target base station that can perform a handover (S305). That is, the macro base station 130 performs a handover determining algorithm with respect to the base stations reported via the Measurement Report, and then determines whether they can perform a handover. When the base stations have enough RSSI to perform a handover or, alternatively, although they do not have enough RSSI to do so, however, when they may perform a handover via a handover determining algorithm designated by a communication service provider, a corresponding base station is set to a target base station that can perform a handover.

When the macro base station 130 ascertains that any of the peripheral base stations included in the received Measurement Report is not a target base station that can perform a handover at step S305, it ignores the information of the received Measurement Report and then awaits the reception of another Measurement Report.

On the contrary, when the macro base station 130 ascertains that any of the peripheral base stations included in the received Measurement Report is a target base station that can perform a handover at step S305, it determines whether the target base station is a femto base station 150 or a macro base station 130 (S307). The macro base station 130 may detect the type of a target base station via information regarding a peripheral base station (e.g., TAI or CGI or PCI), included in the Measurement Report transmitted from the user equipment 200.

When the macro base station 130 ascertains that the target base station is a macro base station 130 at step S307, it transmits a handover request message to the core network entity 120 (S311). On the contrary, when the macro base station 130 ascertains that the target base station is a femto base station 150 at step S307, it searches for identification-information regarding user equipment 200 to perform a handover, and an accessible list according to user equipment, which is stored, and determines whether the target base station exists in the accessible list of a corresponding user equipment 200 (S309). When a femto base station serving as a target base station exists in the accessible list at step S309, the user equipment can be moved to an area under the control of the corresponding target base station (femto base station).

After comparing the identification-information regarding the user equipment 200 to perform a handover target with the accessible list, it is concluded that the user equipment 200 can be moved to the coverage area of the target base station, the macro base station 130 transmits a handover request message, requesting a handover from a corresponding target base station, to the core network entity 120 connected thereto (S311). When receiving the handover request message, the core network entity 120 requests a handover from a target network entity that controls a corresponding target base station.

Meanwhile, when a target base station of corresponding user equipment 200 does not exist in an accessible list at step S309, the user equipment 200 cannot perform a handover to the target base station. In that case, the macro base station 130 cancels a handover process and then awaits the reception of another Measurement Report.

Figure 4:
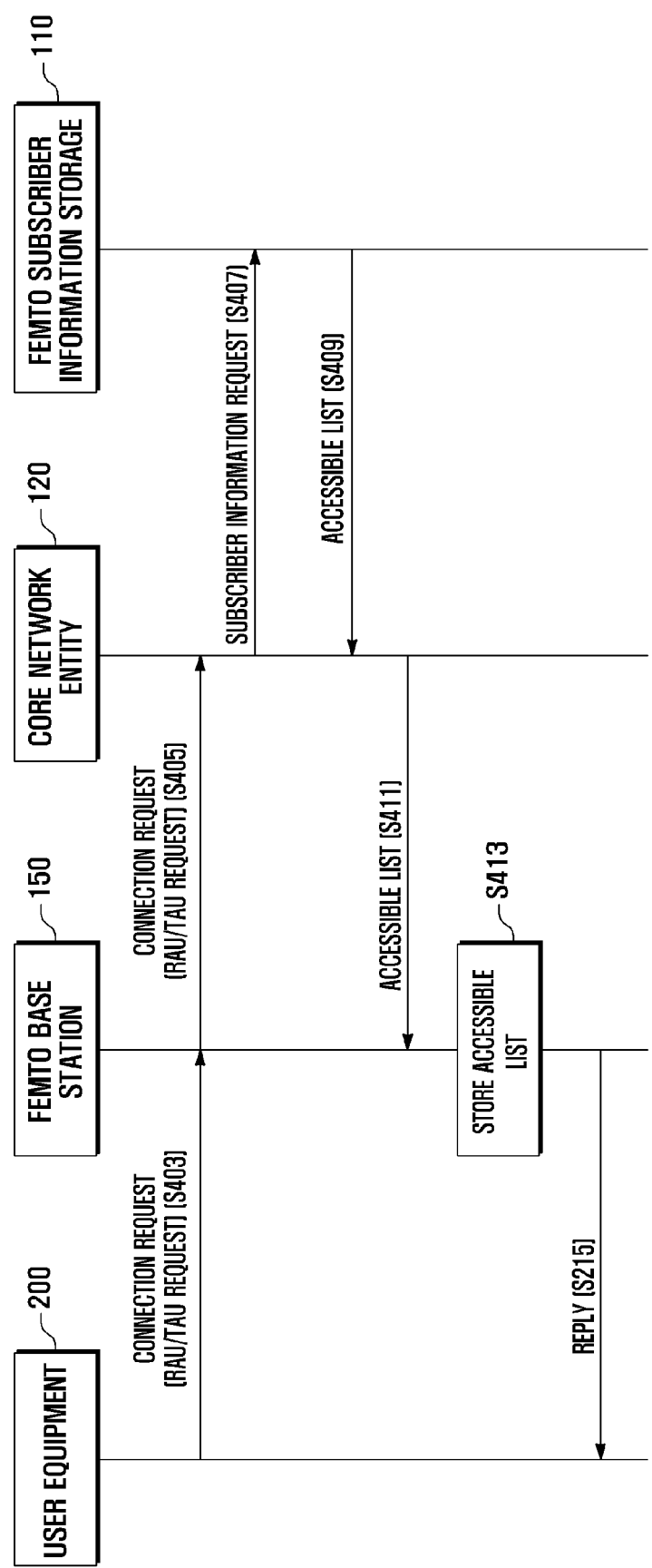
FIG. 4 is a procedure diagram that describes a method for acquiring, by a femto base station, an accessible list of user equipment, according to an embodiment of the invention.

In the following description, when user equipment 200 in a coverage area of a femto base station intends to perform a handover to another femto base station, the acquisition process of an accessible list of corresponding user equipment 200 is described. FIG. 4 is a procedure diagram that describes a method for acquiring, by a femto base station, an accessible list of user equipment, according to an embodiment of the invention.

The procedure shown in FIG. 4 is described, assuming that user equipment 200 is turned on and then initially accesses a broadband wireless communication network or moves to a coverage area under the control of another cell by performing a handover process. It is also assumed that the femto base station is a serving base station of current user equipment 200.

Referring to FIG. 4, the user equipment 200 requests an Attach from the core network entity 120, via the femto base station 150 (S403 and S405). The Attach Request of the user equipment 200 is done so that the user equipment 200 is attached to a broadband wireless communication network when the user equipment 200 is initially turned on.

In addition, when the user equipment 200 requests movement to the core network entity 120 during an idle mode, it can also request a Routing Area Update (RAU) or Tracking Area Update (TAU) from the core network entity 120 via the femto base station 150 (S403 and S405).

After receiving the Attach Request or RAU/TAU Request, the core network entity 120 requests subscriber information regarding the user equipment 200 from the femto subscriber information storage 110 (S407). The subscriber information is an accessible list (or whitelist) for the user equipment 200. When requesting the accessible list, the core network entity 120 also transmits identification-information regarding user equipment. The identification-information regarding user equipment may be a permanent ID or a temporary ID. For example, a permanent ID may be an International Mobile Station Identity (IMSI). In addition, a temporary ID may be a Temporary Mobile Subscriber Identity (TMSI), SAE-Temporary Mobile Subscriber Identity (S-TMSI), or the like.

The femto subscriber information storage 110 searches for an accessible list for the user equipment 200, and then transmits the searched accessible list to the core network entity 120 (S409).

The core network entity 120 transmits the accessible list to the femto base station 150, via a reply to the Attach Request (S411).

The femto base station 150 receives and stores the accessible list for the user equipment 200 (S413). The stored accessible list is used, later, to perform Access Control when the user equipment 200 performs a handover to another femto base station. After that, the femto base station 150 transmits a reply message responding to the Attach Request to the user equipment 200 (S415). The reply message does not include an accessible list.

In the following description, when the femto base station 150 stores an accessible list as described above, it explains how a serving femto base station performs Access Control to perform a handover from the serving base station to a target femto base station.

Figure 5:
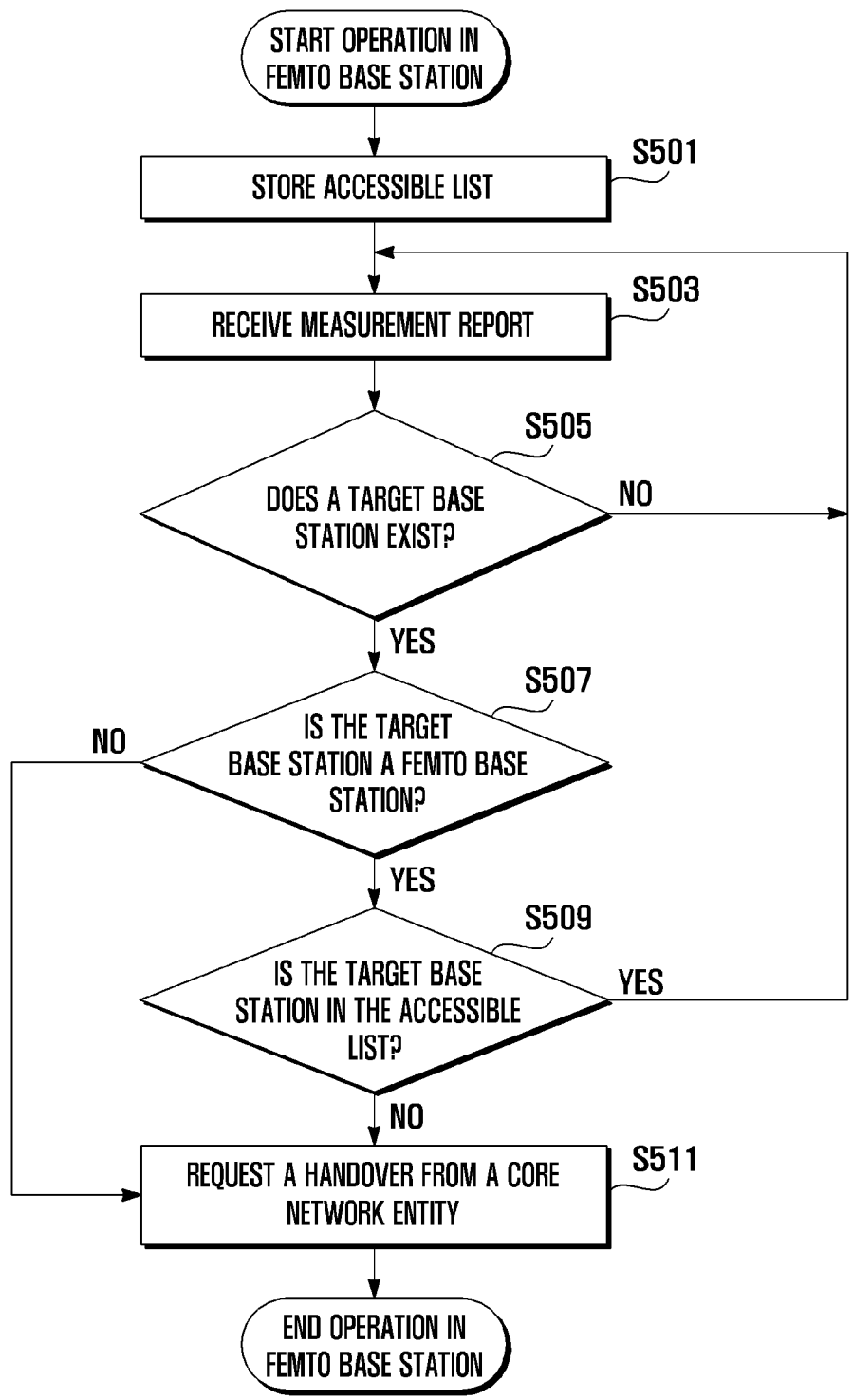
FIG. 5 is a flow chart that describes a method for performing an access control in a femto base station, according to an embodiment of the invention.

FIG. 5 is a flow chart that describes a method for performing an access control in a femto base station, according to an embodiment of the invention.

The method shown in FIG. 5 describes operations for performing a handover when a serving base station and a target base station are femto base stations. In order to differentiate the serving base station and a target base station, the serving base station is denoted as a serving femto base station and a target base station is also denoted as a target femto base station.

Referring to FIG. 5, the serving femto base station 150 has stored an accessible list (S501). The serving femto base station 150 has received and stored the accessible list according to users, via the method described above referring to FIG. 4.

In a state where the serving femto base station 150 stores an accessible list according to users, when a particular predefined event is previously or periodically sensed, the user equipment 200 transmits a Measurement Report to the serving femto base station 150. That is, the user equipment 200 periodically scans peripheral base stations and then transmits information to a serving base station via a Measurement Report. The particular event refers to an event where the RSSI of peripheral base stations is greater than that a serving base station when the different reaches or exceeds a preset value. The user equipment 200 transmits information regarding the peripheral base station according to a corresponding event to a serving base station via a Measurement Report.

The Measurement Report includes information regarding peripheral base stations that the user equipment 200 received from the peripheral base stations. In particular, the Measurement Report may include system information containing identification-information regarding a target femto base station 150. A serving femto base station 150 awaits the reception of a Measurement Report transmitted from the user equipment 200.

The serving femto base station 150 receives a Measurement Report (S503), and then determines whether any of the peripheral base stations included in the received Measurement Report is a target base station that can perform a handover (S505). That is, the serving femto base station 150 performs a handover determining algorithm with respect to the base stations reported via the Measurement Report, and then determines whether they can perform a handover. When the base stations have enough RSSI to perform a handover or, alternatively although they do not have enough RSSI enough to do so, however, when they may perform a handover via a handover determining algorithm designated by a communication service provider, a corresponding base station is set to a target base station that can perform a handover.

When the serving femto base station 150 ascertains that any of the peripheral base stations included in the received Measurement Report is not a target base station that can perform a handover at step S505, it ignores the information of the received Measurement Report and then awaits the reception of another Measurement Report.

On the contrary, when the serving femto base station 150 ascertains that any of the peripheral base stations included in the received Measurement Report is a target base station that can perform a handover at step S505, it determines whether the target base station is a femto-base station (which means that it excludes a serving femto base station) or a macro base station 130 (S507). The serving femto base station 150 may detect the type of target base station via information regarding a peripheral base station (e.g., TAI or CGI or PCI), included in the Measurement Report transmitted from the user equipment 200.

When the serving femto base station 150 ascertains that the target base station is a macro base station 130 at step S507, it transmits a handover request message to the core network entity 120 (S511). When receiving the handover request message, the core network entity 120 requests a handover from a target network entity that controls a corresponding target base station.

On the contrary, when the serving femto base station 150 ascertains that the target base station is a target femto base station 150 at step S507, it searches for identification-information regarding user equipment 200 to perform a handover, and an accessible list according to user equipment, which is stored, and determines whether the target base station exists in the accessible list of a corresponding user equipment 200 (S509). When a target base station exists in the accessible list at step S509, the user equipment can be moved in an area under the control of the corresponding target base station (femto base station).

After comparing identification-information regarding the user equipment 200 to perform a handover target with the accessible list, when it is concluded that the user equipment 200 can be moved to the coverage area of the target base station, the serving femto base station 150 transmits a handover request message to the core network entity 120 connected thereto (S511).

Meanwhile, when a target base station of corresponding user equipment 200 does not exist in an accessible list at step S509, the user equipment 200 cannot perform a handover to the target base station. In that case, the serving femto base station 150 cancels a handover process and then waits for the reception of another Measurement Report.

In the foregoing description, the operations of the serving base station were explained in cases where the serving base station is a macro base station and a femto base station.

Figure 6:
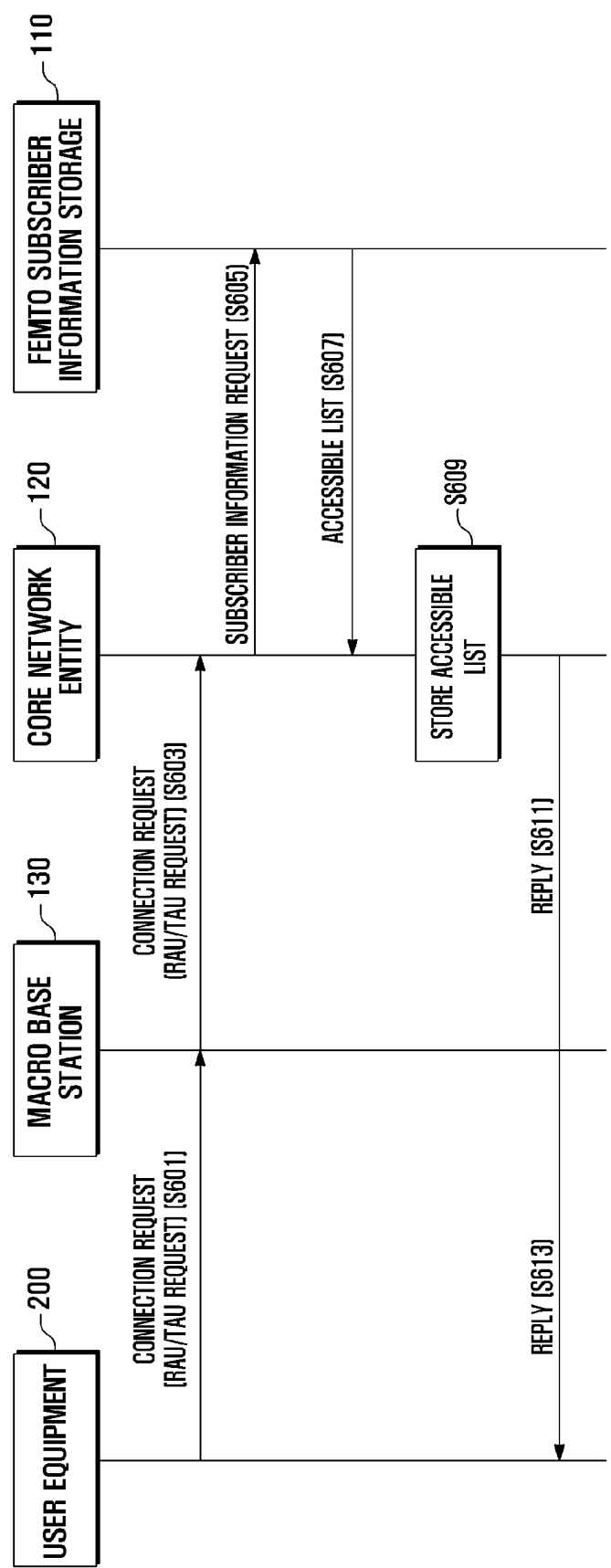
FIG. 6 is a procedure diagram that describes a method for acquiring, by a core network entity, an accessible list of user equipment, according to an embodiment of the invention.

The following description provides a method for performing a handover in a core network entity 120. First, a method is described that the core network entity 120 acquires an accessible list. FIG. 6 is a procedure diagram that describes a method for acquiring, by a core network entity, an accessible list of user equipment, according to an embodiment of the invention.

The procedure shown in FIG. 6 is described, assuming that user equipment 200 is turned on and then initially accesses a broadband wireless communication network or performs a handover process.

Referring to FIG. 6, the user equipment 200 requests an Attach from the core network entity 120, via the macro base station 130 (S601 and S603). The Attach Request of the user equipment 200 is done so that the user equipment 200 is attached to a network when the user equipment 200 is initially turned on.

In addition, when the user equipment 200 requests movement to the core network entity 120 during an idle mode, it can also request a Routing Area Update (RAU) or Tracking Area Update (TAU) from the core network entity 120 via the macro base station 130 (S601 and S603).

After receiving the Attach Request or RAU/TAU Request, the core network entity 120 requests subscriber information from the femto subscriber information storage 110 (S605). The subscriber information is an accessible list of corresponding user equipment (a femto cell subscriber's user equipment). The core network entity 120 also transmits identification-information regarding user equipment. The identification-information regarding user equipment may be a permanent ID (e.g., IMSI) or a temporary ID (e.g., TMSI, S-TMSI, etc.).

The femto subscriber information storage 110 searches for an accessible list for corresponding user equipment 200, and then transmits the searched accessible list to the core network entity 120 (S607).

The core network entity 120 receives and stores the accessible list (S609). The stored accessible list is used, later, to perform Access Control when the user equipment 200 performs a handover to the femto base station 150.

After that, the core network entity 120 transmits a reply message responding to the Attach Request to the user macro base station 130 (S611). The reply message does not include an accessible list. The macro base station 130 transmits a reply message to the user equipment 200 (S613).

Figure 7:
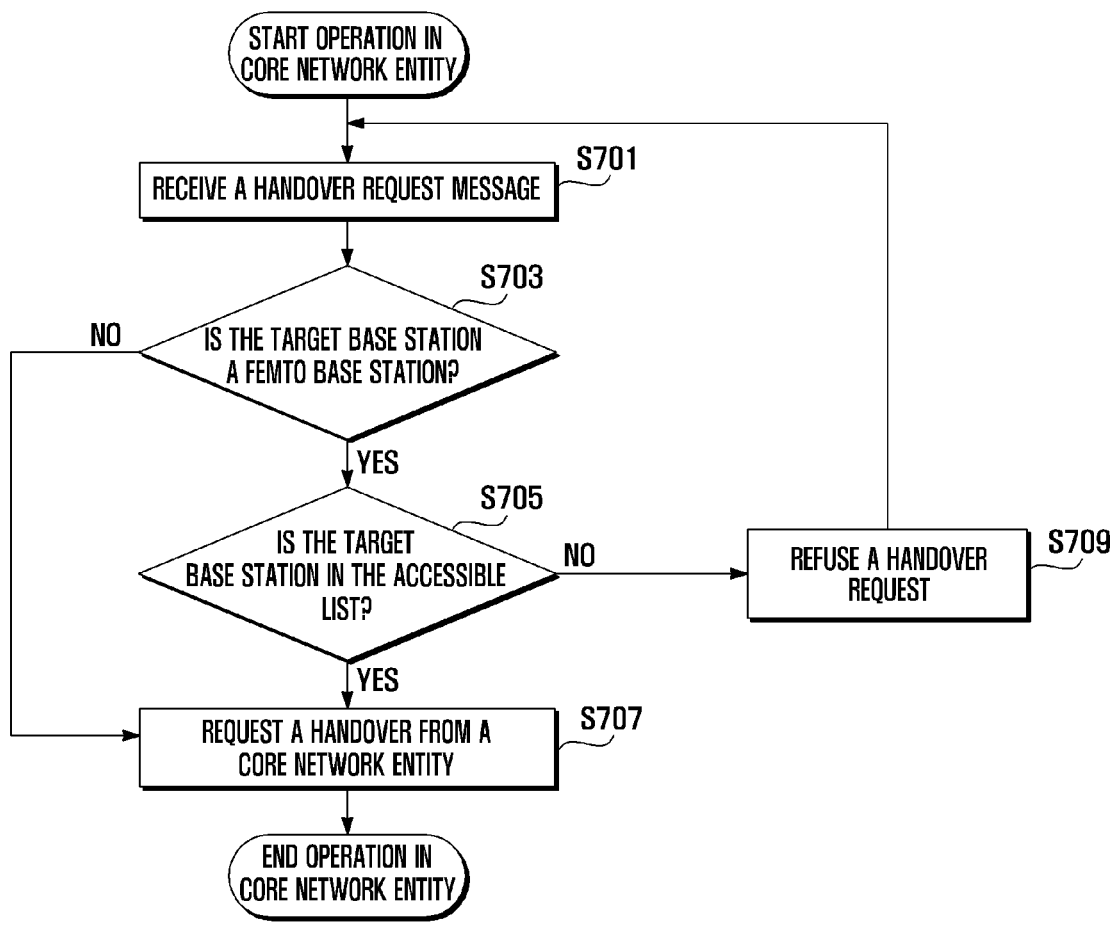
FIG. 7 is a flow chart that describes a method for performing an access control in a core network entity, according to an embodiment of the invention.

The following description provides an operation of the core network entity 120 that performs Access Control for a handover from a macro base station 130 to a target femto base station 150, where the core network entity 120 has stored an accessible list as described in the above section. FIG. 7 is a flow chart that describes a method for performing an access control in a core network entity, according to an embodiment of the invention.

The method shown in FIG. 7 will be described, assuming that the core network entity 120 has stored an accessible list according to user equipment (or subscribers) (S301). That is, the core network entity 120 has received and stored the accessible list according to user equipment (or subscribers), via the method described above referring to FIG. 6.

Referring to FIG. 7, the core network entity 120 receives a handover request message (S701). The handover may be requested before or after the serving base station performs Access Control via an accessible list.

When receiving a handover request message, the core network entity 120 determines whether the target base station requested for handover is a macro base station 130 or a femto base station 150 (S703). The core network entity 120 can detect the type of target base station via ID information regarding the target base station (e.g., CGI of the target base station) or information regarding an additional target network included in the handover request message (e.g., HNBindication, TAI, etc.).

When the core network entity 120 ascertains that the target base station requested for handover is a macro base station 130 at step S703, it does not perform Access Control for the target base station and transmits a handover request message to the target network to which the target base station is connected (S707).

On the contrary, when the core network entity 120 ascertains that the target base station requested for handover is a femto base station 150 at step S703, it determines whether the target base station is included in the accessible list (S705). When the core network entity 120 ascertains that the target base station is included in the accessible list at step S705, it transmits a handover request message to the target network to which the target base station is connected at step S707.

On the contrary, when the core network entity 120 ascertains that the target base station is not included in the accessible list at step S705, it cannot perform a handover to a corresponding cell. Therefore, the core network entity 120 transmits a refusal message for a handover request in order to refuse a handover, and then waits for the reception of another handover request message (S709).

As described the embodiments of the invention, the serving base station or the serving core network entity can store a list of femto base stations that allow for access according to user equipment or subscribers, i.e., an accessible list. Therefore, when the serving base station or the serving core network entity receives a handover towards a femto base station from user equipment, it can perform a handover according to a corresponding condition.

Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A serving base station for performing a handover to a femto base station, comprising:
   a transceiver for data communicating and receiving a measurement report including at least one identifier of the femto base station to request the handover, the measurement report being received from a user equipment as a result of at least one of (i) the user equipment scanning for peripheral base stations at a set period and (ii) a received signal strength indication (RSSI) of any of the peripheral base stations being greater than the RSSI of the serving base station;
   a storage unit for storing an accessible list of each of at least one user equipment, the accessible list is a list of femto base stations that allow for the access of each of the at least one user equipment and is received from a femto subscriber information storage; and
   a controller for:
      determining whether there is a target base station or not based on the measurement report;
      identifying whether the target base station to perform the handover is the femto base station or a macro base station based on the GCID of the femto base station in the measurement report, if the measurement report is received;
      identifying, if the target base station is identified as the femto base station, that the target base station is included in the accessible list of the user equipment and requesting a handover procedure for the target base station when the target base station is included in the accessible list of the user equipment; and
      requesting, if the target base station is identified as the macro base station, the handover procedure for the target base station,
   wherein the accessible list comprises identifiers of the femto base stations to identify the femto stations.

2. The serving base station of claim 1, wherein the controller controls, when the user equipment requests to be attached to the serving base station, the transceiver to transmit a request for the accessible list of the user equipment to the subscriber information storage, via identification-information regarding the user equipment.

3. A core network entity for performing a handover to a femto base station, comprising:
   a transceiver for data communicating and receiving a measurement report including global cell identification (GCID) of the femto base station to request the handover, the measurement report being received from a user equipment as a result of at least one of (i) the user equipment scanning for peripheral base stations at a set period and (ii) a received signal strength indication (RSSI) of any of the peripheral base stations being greater than the RSSI of the serving base station;
   a storage unit for storing an accessible list of each of at least one user equipment, the accessible list is a list of femto base stations that allow for access of each of the at least one user equipment and is received from a femto subscriber information storage; and
   a controller for:
      determining whether there is a target base station or not based on the measurement report;
      identifying whether the target base station to perform the handover is the femto base station or a macro base station based on the GCID of the femto base station in the measurement report, if the measurement report is received;
      identifying, if the target base station is identified as the femto base station, that the target base station is included in the accessible list of the user equipment and requesting a handover procedure for the target base station when the target base station is included in the accessible list of the user equipment; and
      requesting, if the target base station is identified as the macro base station, the handover procedure for the target base station,
   wherein the accessible list comprises identifiers of the femto base stations to identify the femto stations.

4. The core network entity of claim 3, wherein the controller controls, when the user equipment requests to be attached to the core network entity, the transceiver to transmit a request for the accessible list of the user equipment to the subscriber information storage, via identification-information regarding the user equipment.

5. A wireless communication method of a serving base station for performing a handover to a femto base station, comprising:

storing an accessible list of each of at least one user equipment, the accessible list is a list of femto base stations that allow for access of each of the at least one user equipment and is received from a femto subscriber information storage;

receiving a measurement report including global cell identification (GCID) of the femto base station to request the handover, the measurement report being received from a user equipment as a result of at least one of (i) the user equipment scanning for peripheral base stations at a set period and (ii) a received signal strength indication (RSSI) of any of the peripheral base stations being greater than the RSSI of the serving base station;

determining whether there is a target base station or not based on the measurement report;

identifying whether the target base station to perform the handover is the femto base station or a macro base station based on the GCID of the femto base station in the measurement report, if the measurement report is received;

determining, if the target base station is identified as the femto base station, whether the target base station is included in the accessible list of the user equipment and requesting, when the target base station is included in the accessible list of the user equipment, a handover procedure to the target base station; and requesting, if the target base station is identified as the macro base station, the handover procedure to the target base station, wherein the accessible list comprises identifiers of the femto base stations to identify the femto stations.

6. The method of claim 5, wherein storing the accessible list of each of at least one user equipment comprises:

requesting, when the user equipment requests to be attached to the serving base station, the accessible list of the user equipment to the subscriber information storage, via identification-information regarding the user equipment; and receiving the accessible list from the subscriber information storage.

7. A wireless communication method of a core network entity for performing a handover to a femto base station, comprising:

storing an accessible list of each of at least one user equipment, the accessible list is a list of femto base stations that allow for access of each of the at least one user equipment and is received from a femto subscriber information storage;

receiving a measurement report including global cell identification (GCID) of the femto base station to request the handover, the measurement report being received from a user equipment as a result of at least one of (i) the user equipment scanning for peripheral base stations at a set period and (ii) a received signal strength indication (RSSI) of any of the peripheral base stations being greater than the RSSI of a serving base station;

determining whether there is a target base station or not based on the measurement report;

identifying whether the target base station to perform the handover is the femto base station or a macro base station based on the GCID of the femto base station in the measurement report, if the measurement report is received;

determining, if the target base station is identified as the femto base station, whether the target base station is included in the accessible list of the user equipment and requesting, when the target base station is included in the accessible list of the user equipment, a handover procedure to the target base station; and requesting, if the target base station is identified as the macro base station, the handover procedure to the target base station, wherein the accessible list comprises identifiers of the femto base stations to identify the femto stations.

8. The method of claim 7, wherein storing the accessible list of each of at least one user equipment comprises:

requesting, when the user equipment requests to be attached to the core network entity, the accessible list of the user equipment to the subscriber information storage, via identification-information regarding the user equipment; and receiving the accessible list from the subscriber information storage.

* * * * *